(No Model.) 2 Sheets—Sheet 1.

C. H. DUNKS & T. P. GLODY.
BED BUTTOM.

No. 264,641. Patented Sept. 19, 1882.

Attest:
J. C. Turner
J. S. Barker

Inventor:
Charles H. Dunks
and
Thomas P. Glody
By Doubleday & Bliss
Attorneys.

(No Model.) 2 Sheets—Sheet 2.

C. H. DUNKS & T. P. GLODY.
BED BUTTOM.

No. 264,641. Patented Sept. 19, 1882.

Witnesses:
J. C. Turner
J. S. Barker

Inventor:
Charles H Dunks & Thomas P Glody
by Doubleday and Bliss
attys

UNITED STATES PATENT OFFICE.

CHARLES H. DUNKS AND THOMAS P. GLODY, OF NEW YORK, N. Y.

BED-BOTTOM.

SPECIFICATION forming part of Letters Patent No. 264,641, dated September 19, 1882.

Application filed April 29, 1882. (No model.)

*To all whom it may concern:*

Be it known that we, CHARLES H. DUNKS and THOMAS P. GLODY, citizens of the United States, residing at New York, in the county of New York and State of New York, have invented certain new and useful Improvements in Bed-Bottoms, of which the following is a specification, reference being had therein to the accompanying drawings.

Figure 1:
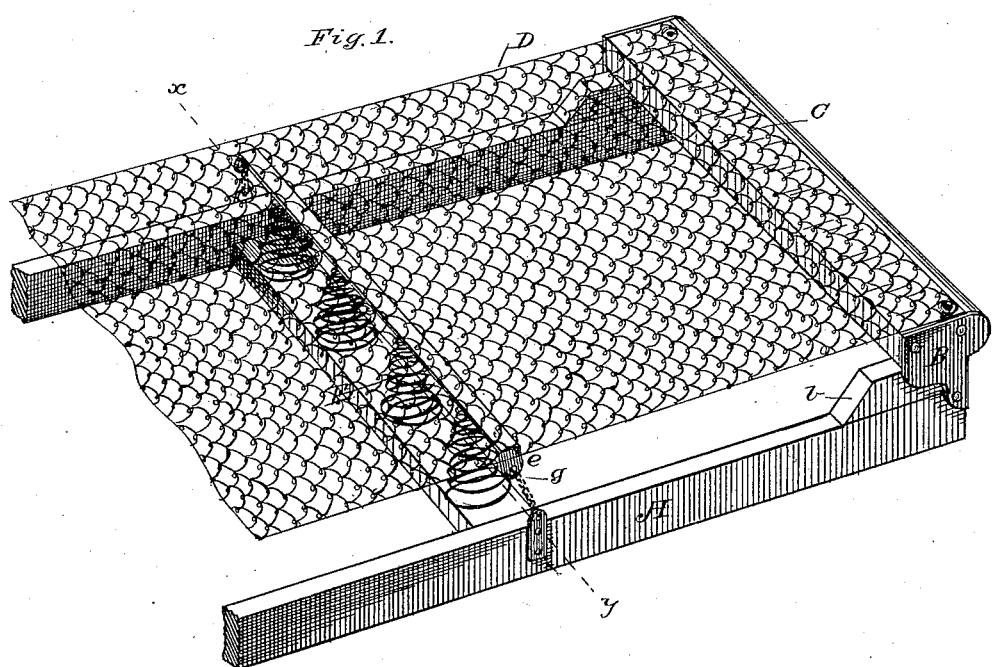
Figure 2:
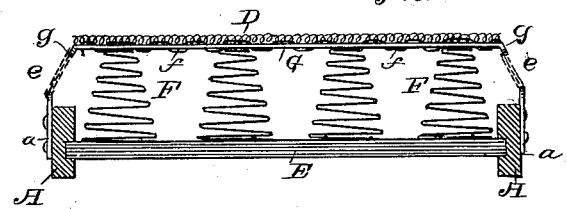
Figure 4:
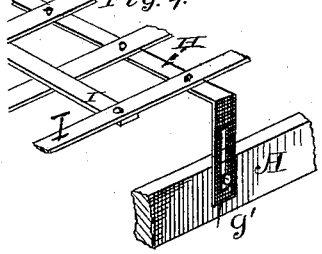
Figure 3:
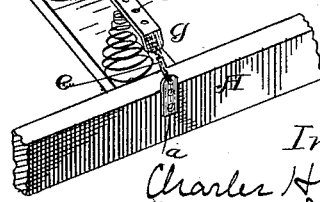
Figure 5:
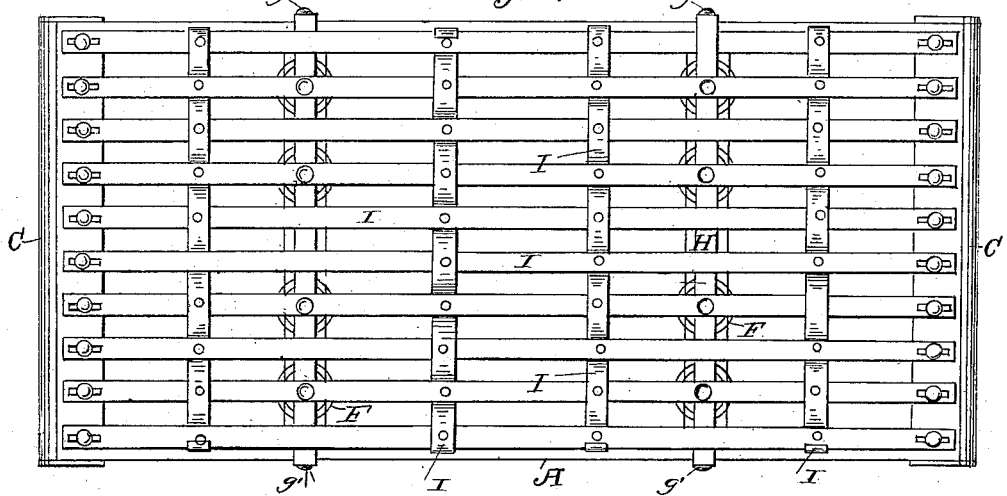
Figure 6:
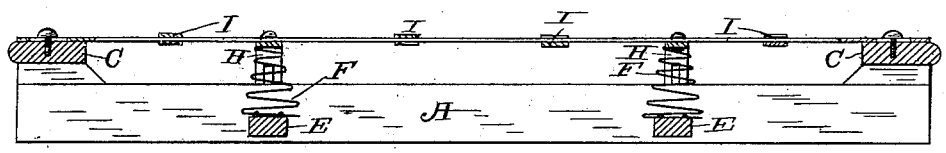
Figure 7:
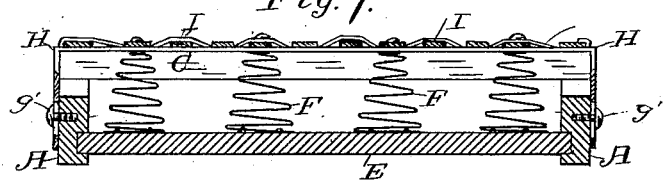

Figure 1 is a perspective view of so much of a bed-bottom as is necessary to illustrate our invention. Fig. 2 is a transverse section on dotted lines $x\,y$, Fig. 1. Fig. 3 is a perspective view of a portion of a bed-bottom, the fabric having been removed therefrom. Fig. 4 is a detached view, illustrating a modification of our invention. Fig. 5 is a transverse section, showing the manner of applying one part of the modification to the bed shown in Fig. 1. Fig. 6 is a longitudinal section. Fig. 7 is a transverse section.

In the drawings, A A represent the side rails of an ordinary bed-bottom.

C is an end rail, connected with the side rails by brackets B or by any usual or approved connecting corner-pieces.

D, Fig. 1, represents a woven-wire fabric.

E is a cross-bar, supported upon the side rails in any usual or approved manner.

F F are volute springs mounted upon cross-piece E.

G is a transverse bar or narrow strip of metal, having its ends bent downward at about a right angle, as indicated at $g\,g$, thus forming ears. The bar G is attached firmly to the upper ends of springs F, preferably by passing the projecting end of each spring through a hole in the bar and then bending down or riveting said ends. The bar G is also provided with a series of holes, $d\,d$, at suitable intervals, the fabric being secured to the bar by means of wire or other clamping device $f$, passing through the holes and over strands of the fabric.

$a\,a$ are lugs or ears secured to the outer faces of the side rails, and provided with holes in their upper ends.

$e\,e$ are stay-chains connecting the outwardly-projecting ears $a\,a$ with the downwardly-projecting ears $g\,g$ of bar G.

It will of course be understood that we propose to use two or more sets of springs F F and corresponding bars G G, placed at suitable intervals apart.

By an examination of the drawings it will be readily understood that in consequence of the lugs $a\,a$ being arranged upon the outer faces of the side rails the stay-chains act more effectively to support the woven-wire fabric against swaying sidewise than they would if the lower ends of the stay-chains were attached to the faces of the side rails, or even upon their upper edges, this being true even though the bar G were of such length that the stay-chains were more nearly vertical in their positions than shown in the drawings.

In Fig. 4 we have shown a modification of the invention in which the stay-chains and lugs $a\,a$ are dispensed with, the bar G being made of such length that its downwardly-bent ends, which are slotted, can be connected with the outer faces of the side rails by means of broad-headed bolts $g'\,g'$, or their equivalents, which pass through the slotted ends of the bar. So, also, in this figure we have shown a different style of flexible fabric, consisting in this instance of narrow interwoven strips of metal (preferably elastic steel) I, which may, when preferred, be secured to the bars G by rivets, which pass through one or more of the longitudinal strips H.

We prefer to make the strips H of a good quality of spring-steel, and it will be readily understood that, while the slots in the downwardly-bent ends of these bars G permit the desired up-and-down movement of the flexible fabric, they also serve to support the fabric against sidewise thrust.

By an examination of the drawings it will be readily seen that by reason of the springs and the slats G and H being secured to the flexible fabric these parts in either of the constructions shown are supported against lateral displacement relative to each other, and that therefore there is but little liability of the upper ends of the springs being materially displaced either toward or from the head of the bed, and that therefore a substantially uniform action upon the springs is maintained and the desirability, as well as the durability, of the bed thereby increased. It will also be noticed that while this result is secured in part independently of the ends of the fabric being attached to the head and foot rails of the bed, (which need not of necessity be done in the construction in Figs. 4, 5, 6, 7,) yet in both constructions the displacement of the springs is more effectually prevented by reason of the ends of the fabric being attached not only to the transverse bars, but also to the end rails.

What we claim is—

1. In a detachable bed-bottom, the combination of side bars, end bars supported above the plane of the side bars, an intermediate cross-bar supported below the plane of the end bars, a row of springs mounted upon said cross-bar, a transverse strip mounted upon the upper ends of the springs, a fabric above the strip, means for securing the ends of the fabric to the end bars and attached to the end bars, and means for attaching the fabric to the transverse strips, substantially as set forth.

2. In a detachable bed-bottom, the combination of side bars, end bars supported above the plane of the side bars, a series of cross-bars supported below the plane of the end bars, springs mounted upon the cross-bars, springs arranged in transverse rows and mounted upon the cross-bars, a series of transverse strips mounted upon the transverse rows of springs, a fabric above the strips, and means for attaching said fabric to the transverse strips, substantially as set forth.

3. In a detachable bed-bottom, the combination of side bars, end bars supported above the plane of the side bars, an intermediate cross-bar supported below the plane of the end bars, a transverse row of springs mounted upon the cross-bar, a transverse slat upon the upper ends of the springs, and yielding stays connecting the ends of the transverse strip with a fastening device attached to the outer faces of the side rails, substantially as set forth.

4. In a detachable bed-bottom, the combination of side bars, end bars supported above the plane of the side bars, an intermediate cross-bar supported below the plane of the end bars, a transverse row of springs mounted upon the cross-bar, a transverse slat upon the upper ends of the springs, and yielding stays formed integrally with the transverse strip and attached to the side rails, substantially as set forth.

In testimony whereof we affix our signatures in presence of two witnesses.

CHARLES H. DUNKS.
THOMAS P. GLODY.

Witnesses:
J. HOMER HILDRETH,
W. RUSSELL CONGLE.